United States Patent
Ukai et al.

(10) Patent No.: US 9,555,341 B2
(45) Date of Patent: Jan. 31, 2017

(54) SPRAY-DRYING DEVICE FOR DEHYDRATED FILTRATE FROM DESULFURIZATION WASTEWATER, AIR POLLUTION CONTROL SYSTEM AND FLUE GAS TREATMENT METHOD

(75) Inventors: Nobuyuki Ukai, Tokyo (JP); Tatsuto Nagayasu, Tokyo (JP); Naoyuki Kamiyama, Tokyo (JP); Seiji Kagawa, Tokyo (JP); Toshihiro Fukuda, Tokyo (JP)

(73) Assignee: MITSUBISHI POWER SYSTEMS, LTD., Tokyo (JP)

( * ) Notice: Subject to any disclaimer, the term of this patent is extended or adjusted under 35 U.S.C. 154(b) by 868 days.

(21) Appl. No.: 13/988,644

(22) PCT Filed: Mar. 22, 2012

(86) PCT No.: PCT/JP2012/057389
§ 371 (c)(1),
(2), (4) Date: May 21, 2013

(87) PCT Pub. No.: WO2012/128330
PCT Pub. Date: Sep. 27, 2012

(65) Prior Publication Data
US 2013/0248121 A1    Sep. 26, 2013

(30) Foreign Application Priority Data

Mar. 24, 2011  (JP) .................................. 2011-066776

(51) Int. Cl.
*B01D 1/18*     (2006.01)
*B01D 53/50*    (2006.01)
(Continued)

(52) U.S. Cl.
CPC ............... *B01D 1/18* (2013.01); *B01D 53/504* (2013.01); *B01D 53/505* (2013.01); *B01D 53/64* (2013.01);
(Continued)

(58) Field of Classification Search
None
See application file for complete search history.

(56) References Cited

U.S. PATENT DOCUMENTS 1,782,054 A    11/1930  Uhl
2,576,264 A    11/1951  Coulter et al.
(Continued)

FOREIGN PATENT DOCUMENTS

CN    1803689 A      7/2006
CN    101925393 A    12/2010
(Continued)

OTHER PUBLICATIONS

International search report, accessed May 24, 2016.*
(Continued)

*Primary Examiner* — Duane Smith
*Assistant Examiner* — Phillip Shao
(74) *Attorney, Agent, or Firm* — Westerman, Hattori, Daniels & Adrian, LLP (57) ABSTRACT

A spray-drying device includes a spray nozzle that sprays the dehydrated filtrate from the desulfurization wastewater, in a spray-drying device body, an inlet that is provided in the spray-drying device body and introduces flue gas for drying spray liquid, a dry area that is provided in the spray-drying device body and dries the dehydrated filtrate by the flue gas, an outlet that discharged the flue gas contributing to the drying, a plurality of thermometers that are provided in the dry area and measure temperatures of the inside, a determination unit that determines whether or not a spray-drying
(Continued)

state of the dehydrated filtrate is satisfactory on the basis of the measurement results of the thermometers, and a control unit that adjusts the flue gas or the dehydrated filtrate when it is determined that the spray-drying is not satisfactory as a result of the determination of the determination unit.

4 Claims, 5 Drawing Sheets

(51) Int. Cl.
    *B01D 53/64* (2006.01)
    *B01D 53/75* (2006.01)
    *B01D 53/86* (2006.01)
    *C02F 1/04* (2006.01)
    *C02F 11/12* (2006.01)
    *C02F 1/00* (2006.01)
    *C02F 1/12* (2006.01)
    *C02F 1/16* (2006.01)
    *C02F 103/18* (2006.01)

(52) U.S. Cl.
    CPC ........... *B01D 53/75* (2013.01); *B01D 53/8625* (2013.01); *C02F 1/048* (2013.01); *C02F 11/121* (2013.01); *B01D 2251/2062* (2013.01); *B01D 2251/2065* (2013.01); *B01D 2251/2067* (2013.01); *B01D 2251/404* (2013.01); *B01D 2251/606* (2013.01); *B01D 2257/302* (2013.01); *B01D 2257/404* (2013.01); *B01D 2257/602* (2013.01); *B01D 2258/0283* (2013.01); *C02F 1/008* (2013.01); *C02F 1/12* (2013.01); *C02F 1/16* (2013.01); *C02F 11/123* (2013.01); *C02F 11/127* (2013.01); *C02F 2103/18* (2013.01); *C02F 2209/02* (2013.01)

(56) References Cited

U.S. PATENT DOCUMENTS 5,624,530 A * 4/1997 Sadykhov ............ B01D 1/0082
                                                                                 159/23

2009/0074629 A1 * 3/2009 Maryamchik ........... F23C 10/10
                                                                                   422/139
2010/0119428 A1     5/2010 Nagayasu et al.
2012/0287285 A1 * 11/2012 Jensen ...................... B01J 2/04
                                                                              348/159

FOREIGN PATENT DOCUMENTS

| | | |
|---|---|---|
| EP | 0104021 A2 | 3/1984 |
| JP | 52-062770 A | 5/1977 |
| JP | 61-204633 U | 12/1986 |
| JP | 63-200818 A | 8/1988 |
| JP | 01-094920 A | 4/1989 |
| JP | 05-212369 A | 8/1993 |
| JP | 09-313881 A | 12/1997 |
| JP | 2008-246406 A | 10/2008 |
| KR | 2013-0081283 A | 7/2013 |
| WO | 2006-030398 A1 | 3/2006 |
| WO | 2008/123489 A1 | 10/2008 |

OTHER PUBLICATIONS

Korean Notice of Allowance dated Oct. 17, 2014, issued in corresponding KR Application No. 10-2013-7013266 with English partial translation (3 pages).
International Search Report of PCT/JP2012/057389, mailing date of Jun. 26, 2012, With English translation.
Written Opinion of PCT/JP2012/057389, mailing date of Jun. 26, 2012, With English translation.
Chinese Office Action dated Aug. 21, 2014, issued in corresponding CN application No. 201280003708.1 with English translation (24 pages).
Extended European Search Report dated Sep. 26, 2014, issued in corresponding EP application No. 12761372.7 (8 pages).
Notification of Grant of Invention Patent dated Apr. 16, 2015, issued in corresponding Chinese Patent Application No. 2012800037081, with English translation (2 pages).
Notification of Completion of Formalities for Registration dated Apr. 16, 2015, issued in corresponding Chinese Patent Application No. 201280003708.1, with English translation (2 pages).

* cited by examiner

SPRAY-DRYING DEVICE FOR DEHYDRATED FILTRATE FROM DESULFURIZATION WASTEWATER, AIR POLLUTION CONTROL SYSTEM AND FLUE GAS TREATMENT METHOD

FIELD

The present invention relates to a spray-drying device for dehydrated filtrate from desulfurization wastewater generated at the time of flue gas treatment of treating flue gas discharged from a boiler, air pollution control system and method.

BACKGROUND

In the related art, an air pollution control system for treating flue gas discharged from a boiler provided in thermal power generation facilities is known. The air pollution control system is provided with a denitration device that removes nitrogen oxides from the flue gas discharged from the boiler, an air heater that recovers heat of the flue gas passing through the denitration device, and a precipitator that removes soot dust of the flue gas after the heat recovery, and a desulfurization device that removes sulfur oxides of the flue gas after the dust removal. As the desulfurization device, a wet-type desulfurization device that brings a limestone absorbent into gas-liquid contact with the flue gas to remove the sulfur oxides of the flue gas is generally used.

Wastewater (hereinafter, referred to as "desulfurization wastewater") discharged from the wet-type desulfurization device includes a large amount of various harmful substances such as ions such as chlorine ions and ammonium ions and mercury. For this reason, it is necessary to remove such harmful substances from the desulfurization wastewater before discharging the desulfurization wastewater out of the system, but there is a problem that treatment of removing various harmful substances included in the desulfurization wastewater is complex and a treatment cost is high. Therein, in order to reduce the treatment cost of the desulfurization wastewater, a method of reusing the desulfurization wastewater in the system without discharging it out of the system is proposed. For example, in Patent Literatures 1 and 2, an flue gas treatment device is disclosed, in which facilities branched from an flue gas duct of a main line, to which the denitration device, the air heater, the precipitator, and the desulfurization device are connected, and spraying the desulfurization wastewater to form gas are separately provided, a part of the flue gas is introduced from the flue gas duct of the main line into the facilities, the desulfurization wastewater is sprayed into the flue gas in the facilities to be evaporated to precipitate the harmful substances, and then the gas is returned to the flue gas duct of the main line (Patent Literatures 1 and 2).

CITATION LIST

Patent Literature

Patent Literature 1: Japanese Patent Application Laid-open No. 63-200818
Patent Literature 2: Japanese Patent Application Laid-open No. 9-313881

SUMMARY

Technical Problem

However, in the flue gas treatment device of Patent Literatures 1 and 2, facilities in which a part of the flue gas is branched from the flue gas duct and the desulfurization wastewater (or drainage water) is sprayed from the desulfurization device to form gas are provided, to evaporate the desulfurization wastewater. However, the desulfurization wastewater from the desulfurization device contains solid contents, and thus there is a problem that it is difficult to satisfactorily perform the spray-drying.

In addition, recently, for environment-friendliness with respect to water resources in inland regions, non-drainage in the flue gas treatment facilities is desired, and thus appearance of flue gas treatment facilities to achieve stably operable non-drainage is desired.

As facilities performing the non-drainage, a spray drier that dries the desulfurization wastewater may be used, but there are the following problems in the case of performing the spray-drying of the desulfurization wastewater.
1) Problem Caused by Disarray of Heat Quantity Balance To evaporate the spray liquid, drying is promoted by heat exchange between the spray liquid and warm air, but an evaporation defect occurs when the spray liquid is excessive with respect to the warm air.
2) Problem Caused by Coarsening of Liquid Droplets Diameter of Spray Liquid by Ash Attachment When ash is attached to a spray nozzle leading end portion, the spray liquid droplet diameters generated from the nozzle are changed to be generally coarsened. In the coarsened liquid droplets, a specific surface area subjected to heat exchange with the warm air is small, the heat exchange is slow, and thus an evaporation delay occurs.

The invention has been made to solve the problems, and an object of the invention is to provide a spray-drying device of dehydrated filtrate from desulfurization wastewater, an air pollution control system, and a flue gas treatment method, to achieve stably operable non-drainage.

Solution to Problem

According to a first aspect of the present invention in order to solve the problems, there is provided a spray-drying device for dehydrated filtrate from desulfurization wastewater including: a spray nozzle that sprays the dehydrated filtrate from the desulfurization wastewater, in a spray-drying device body; an inlet that is provided in the spray-drying device body and introduces flue gas for drying spray liquid; a dry area that is provided in the spray-drying device body and dries the dehydrated filtrate by the flue gas; an outlet that discharges the flue gas contributing to the drying; a plurality of thermometers that are provided in the dry area and measure temperatures of the inside; a determination unit that determines whether or not a spray-drying state of the dehydrated filtrate is satisfactory on the basis of the measurement results of the thermometers; and a control unit that adjusts the flue gas or the dehydrated filtrate when it is determined that the spray-drying is not satisfactory as a result of the determination of the determination unit.

According to a second aspect of the present invention, there is provided the spray-drying device for the dehydrated filtrate from the desulfurization wastewater according to the first aspect, wherein the adjustment of the dehydrated filtrate is performed by increasing or decreasing the supply amount of dehydrated filtrate or increasing or decreasing the supply amount of atomized air.

According to a third aspect of the present invention, there is provided the spray-drying device for the dehydrated filtrate from the desulfurization wastewater according to the first aspect, wherein the adjustment of the flue gas is performed by controlling the introduction amount of flue gas.

According to a fourth aspect of the present invention, there is provided the spray-drying device for the dehydrated filtrate from the desulfurization wastewater according to any one of the first to third aspect, wherein it is determined whether or not the spray-drying is satisfactory on the basis of a temperature decrease degree.

According to a fifth aspect of the present invention, there is provided an air pollution control system including: a boiler that burns fuel; an air heater that recovers heat of flue gas from the boiler; a precipitator that removes soot dust of the flue gas after the heat recovery; a desulfurization device that removes sulfur oxides included in the flue gas after the dust removal by an absorbent; a dehydrator that removes gypsum from desulfurization wastewater discharged from the desulfurization device; the spray-drying device according to any one of the first to fourth aspects provided with a spray unit that sprays the dehydrated filtrate from the dehydrator; and a flue gas introduction line that introduces a part of the flue gas into the spray-drying device.

According to a sixth aspect of the present invention, there is provided the air pollution control system according to the fifth aspect, further including a solid-liquid separation device that removes suspended substances of the dehydrated filtrate sprayed from the dehydrator.

According to a seventh aspect of the present invention, there is provided a flue gas treatment method including: recovering heat of flue gas from a boiler that burns fuel by an air heater; and removing, by a desulfurization device, sulfur oxides included in the flue gas after the heat recovery by an absorbent, wherein when spray-drying of dehydrated filtrate in which gypsum is removed from desulfurization wastewater discharged from the desulfurization device is performed by a part of the flue gas, the spray-drying state of the dehydrated filtrate is performed while monitoring a temperature state in the dry area.

According to an eighth aspect of the present invention, there is provided the flue gas treatment method according to the seventh aspect, wherein spray-drying of separation liquid from which suspended substances of the dehydrated filtrate is removed is performed.

Advantageous Effects of Invention

According to the invention, when the dehydrated filtrate from which gypsum is excluded from the desulfurization wastewater divided from the desulfurization device using the flue gas from the boiler is sprayed by the spray drier, the spray-drying state is checked. When there is a spray defect, it is removed to perform stable spraying. Accordingly, it is possible to realize the non-drainage of the desulfurization wastewater from the desulfurization device.

BRIEF DESCRIPTION OF DRAWINGS

FIG. 3-1 is a diagram illustrating a relationship between distances from nozzles with respect to thermometers ($T_1$ to $T_7$) provided at seven portions in a spray-drying device body, and measured temperatures.

FIG. 3-2 is a diagram illustrating a relationship between distances from nozzles with respect to thermometers ($T_1$ to $T_7$) provided at seven portions in a spray-drying device body, and measured temperatures.

DESCRIPTION OF EMBODIMENTS

Hereinafter, the invention will be described in detail with reference to the drawings. In addition, the invention is not limited to an embodiment, and when there are a plurality of embodiments, the invention includes a configuration obtained by combining the embodiments. In addition, constituent elements in the following embodiments include what is easily assumable by a person skilled in the art, or substantially the same.

First Embodiment

Figure 1:
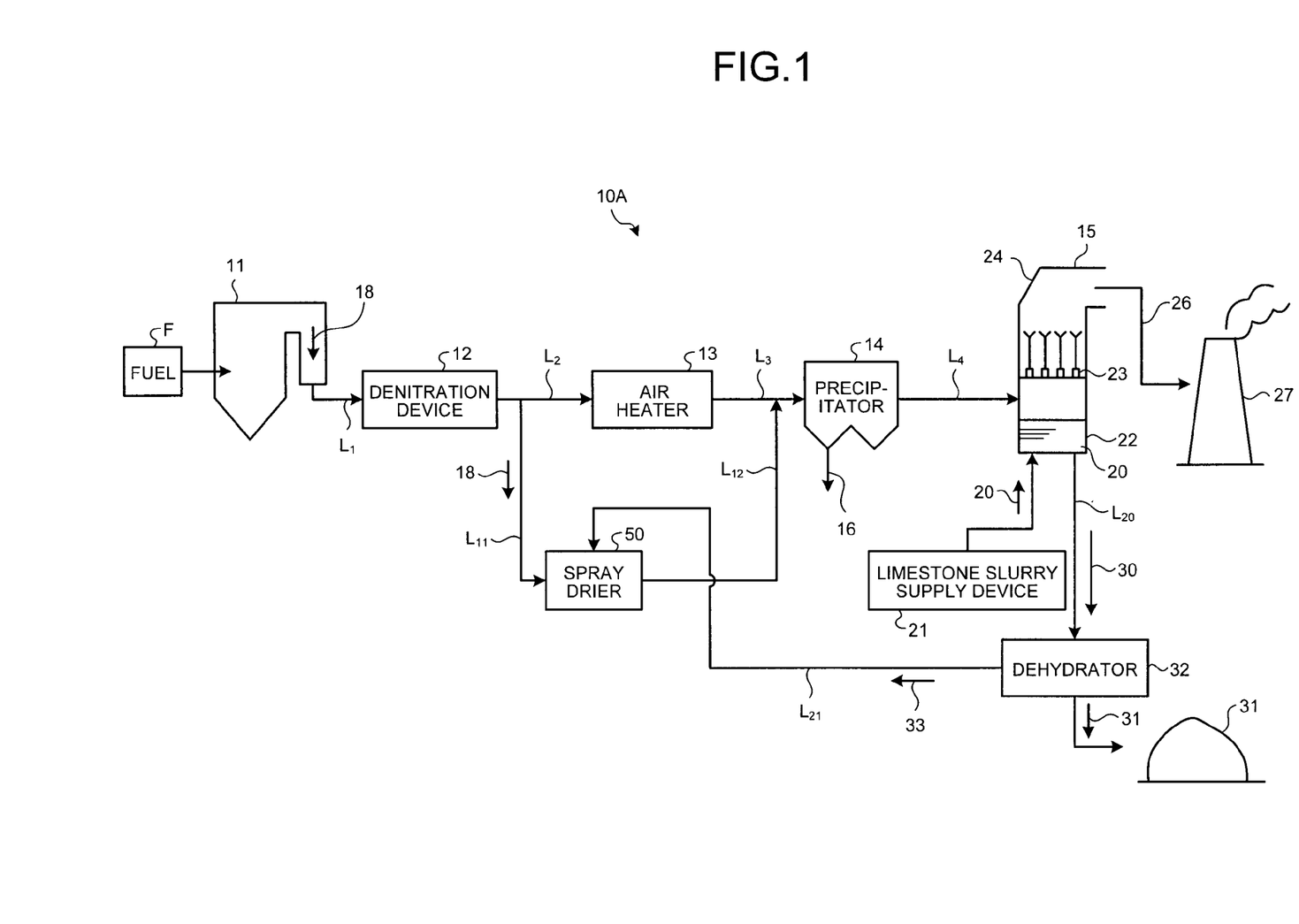
FIG. 1 is a schematic diagram illustrating a configuration of an air pollution control system according to a first embodiment.

FIG. 1 is a schematic diagram illustrating a configuration of an air pollution control system according to a first embodiment. An air pollution control system 10A exemplified in FIG. 1 is a device that removes harmful substances such as nitrogen oxides ($NO_x$), sulfur oxides ($SO_x$), mercury (Hg) from flue gas 18 discharged from a boiler 11 such as a coal-fired boiler using coal as fuel and a heavy-oil-fired boiler using heavy oil as fuel.

The air pollution control system 10A includes the boiler 11 that burns fuel F, an air heater 13 that recovers heat of the flue gas 18 from the boiler 11, a precipitator 14 that removes soot dust of the flue gas 18 after the heat recovery, a desulfurization device 15 that removes sulfur oxides included in the flue gas 18 after the dust removal by limestone slurry 20 that is an absorbent, a dehydrator 32 that removes gypsum 31 from desulfurization wastewater 30 discharged from the desulfurization device 15, a spray drier 50 that is provided with a spray unit spraying dehydrated filtrate 33 from the dehydrator 32, and an flue gas introduction line $L_{11}$ that introduces a part of the flue gas 18 into the spray drier 50. Accordingly, spray-drying is performed by the spray drier 50 using the dehydrated filtrate 33 from which the gypsum is removed, and thus it is possible to perform stable spraying.

Accordingly, clogging does not occur in the spray drier, and it is possible to stably perform non-drainage of moisture of the desulfurization wastewater.

A denitration device 12 is a device that removes nitrogen oxides of the flue gas 18 supplied from the boiler 11 through the gas supply line $L_1$, and has denitration catalyst layer (not illustrated) therein. A reductant injector (not illustrated) is disposed in front flow of the denitration catalyst layer, and a reductant is injected from the reductant injector into the flue gas 18. Herein as the reductant, for example, ammonia, urea, ammonium chloride, or the like is used. The nitrogen oxides of the flue gas 18 introduced to the denitration device 12 come in contact with the denitration catalyst layer, and the nitrogen oxides of the flue gas 18 are resolved and removed into nitrogen gas ($N_2$) and water ($H_2O$). In addition, with respect to the mercury of the flue gas 18, when the chlorine (Cl) of the flue gas is increased, a ratio of watersoluble mercury (II) chloride is increased, and it is easy to collect the mercury by the desulfurization device 15 to be described later.

In addition, the denitration device 12 described above is not essential. When concentration of the nitrogen oxides or concentration of mercury in the flue gas 18 discharged from the boiler 11 is very low, or such substances are not included in the flue gas 18, the denitration device 12 may not be provided.

The air heater 13 is a heat exchanger that recovers the heat of the flue gas 18 supplied through the flue gas supply line $L_2$ after the nitrogen oxides are removed by the denitration device 12. A temperature of the flue gas 18 passing through the denitration device 12 is high such as 350° C. to 400° C., and thus heat exchange is performed between the high-temperature flue gas 18 and the normal-temperature air for combustion by the air heater 13. The air for combustion having the high temperature by the heat exchange is supplied to the boiler 11. Meanwhile, the flue gas 18 subjected to the heat exchange with the normal-temperature air for combustion is cooled to about 150° C.

The precipitator 14 removes the soot dust of the flue gas 18 supplied through the gas supply line $L_3$ after heat removal. The precipitator 14 may be an inertial force precipitator, a centrifugal force precipitator, a filtration type precipitator, an electrical precipitator, a cleaning precipitator, but is not limited particularly.

The desulfurization device 15 is a device that removes the sulfur oxides of the flue gas 18 supplied through the gas supply line $L_4$ in a wet manner after removing soot dust. In the desulfurization device 15, the limestone slurry 20 (an aqueous solution in which limestone powder is solved in water) is used as an alkali absorbent, and a temperature in the device is adjusted to about 30 to 80° C. The limestone slurry 20 is supplied from a limestone slurry supply device 21 to a bottom portion 22 of the desulfurization device 15. The limestone slurry 20 supplied to the bottom portion 22 of the desulfurization device 15 is transmitted to the plurality of nozzles 23 in the desulfurization device 15 through an absorbent supply line (not illustrated), and is ejected from the nozzles 23 to a top portion 24. The flue gas 18 rising from the bottom portion 22 of the desulfurization device 15 comes in liquid-gas contact with the limestone slurry 20 ejected from the nozzles 23, the sulfur oxides and mercuric chlorides of the flue gas 18 is thereby absorbed into the limestone slurry 20, and is separated and removed from the flue gas 18. The flue gas 18 purified by the limestone slurry 20 is discharged as a purification gas 26 from the top portion 24 side of the desulfurization device 15, and is discharged from a stack 27 out of the system.

In the desulfurization device 15, the sulfur oxides $SO_x$ of the flue gas 18 causes a reaction to the limestone slurry 20 represented by the following formula (1).

$$CaCO_3 + SO_2 + 0.5H_2O \rightarrow CaSO_3 \cdot 0.5H_2O + CO_2 \quad (1)$$

In addition, the limestone slurry 20 absorbing the $SO_x$ of the flue gas 18 is oxidization-processed by the air (not illustrated) supplied to the bottom portion 22 of the desulfurization device 15, and causes a reaction to the air represented by the following formula (2).

$$CaSO_3 \cdot 0.5H_2O + 0.5O_2 + 1.5H_2O \rightarrow CaSO_4 \cdot 2H_2O \quad (2)$$

As described above, the $SO_x$ of the flue gas 18 is collected in a form of gypsum $CaSO_4 \cdot 2H_2O$ with respect to the desulfurization device 15.

In addition, as described above, the limestone slurry 20 obtained by pumping liquid stored in the bottom portion 22 of the desulfurization device 15 is used, but the gypsum $CaSO_4 \cdot 2H_2O$ is mixed with the pumped limestone slurry 20 according to the operation of the desulfurization device 15 by the reaction formulas (1) and (2). Hereinafter, the pumped limestone gypsum slurry (a gypsum-mixed limestone slurry) is referred to as an absorbent.

The absorbent (the limestone gypsum slurry) used in the desulfurization is discharged as the desulfurization wastewater 30 from the bottom portion 22 of the desulfurization device 15 to the outside, is transmitted to the dehydrator 32 through a drainage line $L_{20}$ to be described later, and is dehydrated herein. The desulfurization wastewater 30 includes heavy metals such as mercury or halogen ions such as $Cl^-$, $Br^-$, $I^-$, and $F^-$, in addition to the gypsum.

The dehydrator 32 separates the solid and liquid dehydrated filtrate 33 by including the gypsum 31 in the desulfurization wastewater 30. As the dehydrator 32, for example, a belt filter, a centrifugal separator, a decanter-type centrifugal settler, or the like is used. The gypsum 31 of the desulfurization wastewater 30 discharged from the desulfurization device 15 is separated by the dehydrator 32. At that time, the mercuric chlorides of the desulfurization wastewater 30 is separated with the gypsum 31 from the liquid with the mercuric chlorides absorbed to the gypsum 31. The separated gypsum 31 is discharged out of the system (hereinafter, referred to as "system outside").

Meanwhile, the dehydrated filtrate 33 that is a separator liquid is transmitted to the spray drier 50 through the dehydration line $L_{21}$. In addition, the dehydrated filtrate 33 may be temporarily stored in a drainage tank (not illustrated).

The spray drier 50 includes a gas introduction unit to which a part of the flue gas is introduced through the flue gas introduction line $L_{11}$ branched from the flue gas supply line $L_2$, and a spray unit that sparges or sprays the dehydrated filtrate 33. The dehydrated filtrate 33 sparged by the heat of the introduced flue gas 18 is evaporated and dried. In addition, a reference sign $L_{12}$ denotes an flue gas supply line that supplies the flue gas contributing to the drying in the spray drier, to the gas supply line $L_3$.

In the invention, the spray-drying of the dehydrated filtrate 33 in which the gypsum 31 is removed from the desulfurization wastewater is performed, and thus it is possible to prevent clogging in the spray unit.

That is, the desulfurization wastewater itself is not sprayed, and thus it is possible to drastically reduce the amount of dry particles generated according to the evaporation of the desulfurization wastewater. As a result, it is possible to reduce the clogging caused by attachment of the dry particles. In addition, by dehydrating the desulfurization wastewater 30, the mercuric chlorides are separated and removed with the gypsum 31, and thus it is possible to prevent the concentration of mercury from increasing in the flue gas 18 at the time of spraying the wastewater.

In addition, in the embodiment, since a part of the flue gas flowing into the air heater 13 is branched from the flue gas supply line $L_2$ through the flue gas introduction line $L_{11}$, the temperature of the flue gas is high (350 to 400° C.), and it is possible to efficiently perform the spray-drying of the dehydrated filtrate 33.

Figure 2:
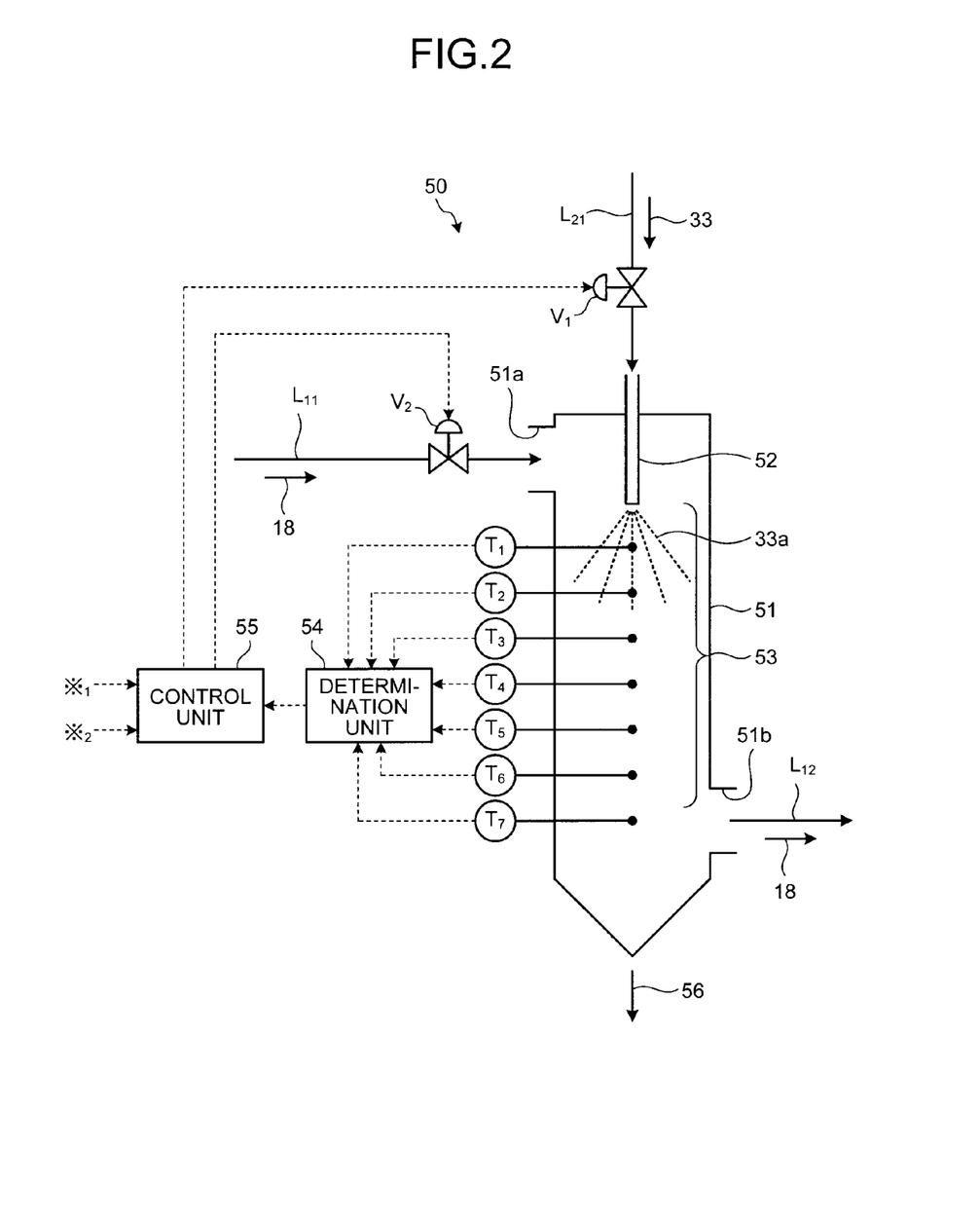
FIG. 2 is a schematic diagram of a spray drier of dehydrated filtrate from desulfurization wastewater according to the first embodiment.

FIG. 2 is a schematic diagram of the spray drier of the dehydrated filtrate from the desulfurization wastewater according to the embodiment.

As illustrated in FIG. 2, the spray-drying device of the embodiment includes a spray nozzle 52 that sprays the dehydrated filtrate 33 from the desulfurization wastewater, in a spray-drying device body 51, an inlet 51a that is provided in the spray-drying device body 51 and introduces the flue gas 18 for drying spray liquid 33a, a dry area 53 that is provided in the spray-drying device body 51 and dries the dehydrated filtrate 33 by the flue gas 18, an outlet 51b that discharges the flue gas 18 contributing to the drying, a plurality of thermometers $T_1$ to $T_7$ that are provided in the dry area 53 and measure temperatures of the inside, a determination unit 54 that determines whether or not a spray-drying state of the dehydrated filtrate 33 is satisfactory on the basis of the measurement results of the thermometers $T_1$ to $T_7$, and a control unit 55 that adjusts the flue gas 18 or the dehydrated filtrate 33 when it is determined that the spray-drying is not satisfactory as a result of the determination of the determination unit 54. In addition, a separated solid material is denoted by a reference sign 56, and a supply line $L_{22}$ supplies the dehydrated filtrate 33 to a precipitation ash 16.

In the embodiment, the thermometers ($T_1$ to $T_7$) are provided at seven portions, but the invention is not limited thereto, and they may be appropriately changed according to the length of the dry area 53.

In addition, the temperature measurement is provided at the vertical axial line portion of the device body, but the invention is not limited thereto, and the temperature measurement may be provided anywhere as long as the evaporation state can be confirmed.

Figure 31:
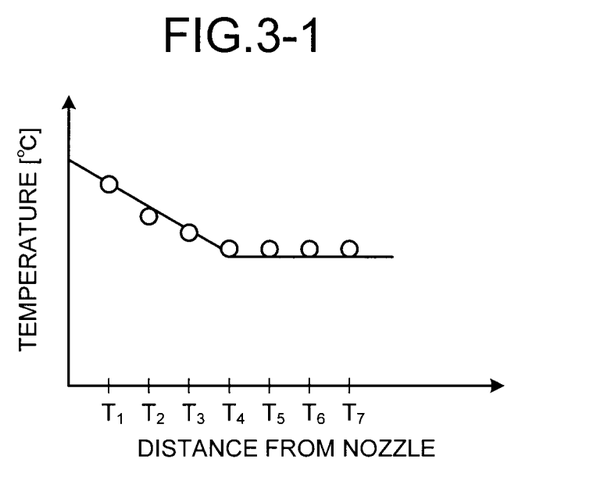
Figure 32:
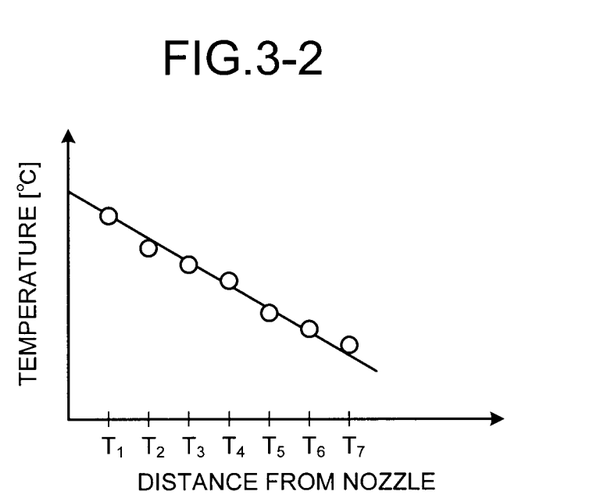

FIG. 3-1 and FIG. 3-2 are diagrams illustrating relationships between the distances from the nozzles with respect to the thermometers ($T_1$ to $T_7$) provided at seven portions in the spray-drying device body, and the measured temperatures.

Herein, in the course of evaporation of the liquid, heat is necessary for temperature increase or evaporation of liquid droplets of the spray liquid 33a. In this case, the heat of the flue gas 18 is used for the temperature increase or evaporation of the liquid droplets, and thus the temperature of the flue gas 18 is lowered. By detecting the decrease of the temperature, it is possible to determine whether or not the drying is satisfactory.

FIG. 3-1 is a diagram illustrating the relationship when the drying is satisfactory, and FIG. 3-2 is a diagram illustrating the relationship when the drying is not satisfactory.

In FIG. 3-1, the temperature decrease is stopped in the vicinity of $T_4$, and the temperature is constant. This is because there is no liquid droplet of the spray liquid 33a.

On the other hand, in FIG. 3-2, the temperature is discontinuously decreased to $T_7$. This is because a large amount of liquid droplets of the spray liquid 33a remains.

The result is determined by the determination unit 54.

As the result of the determination of the determination unit 54, when the drying is satisfactory, the spray-drying of the dehydrated filtrate 33 is continued as it is.

On the other hand, as the result of the determination of the determination unit 54, when it is determined that the drying is not satisfactory, adjustment of the flue gas 18 or the dehydrated filtrate 33 is performed by the control unit 55.

Specifically, in the adjustment of the dehydrated filtrate 33, an adjustment valve $V_1$ is operated to adjust the liquid droplet diameters of the spray liquid by increase and decrease of the supply amount of the dehydrated filtrate 33 or increase and decrease of the supply amount of the atomized air supplied to the spray nozzles 52.

In addition, a buffer tank that stockpiles a predetermined amount of dehydrated filtrate 33 may be provided to perform the adjustment.

For this reason, flow rate information (*1) obtained by measuring a flow rate of the dehydrated filtrate 33 (not illustrated) and flow rate information (*2) obtained by measuring a flow rate of the flue gas 18 are input to the control unit 55, and the adjustment of a valve opening degree or the adjustment of the flow rate of the pump (not illustrated) is performed on the basis of the information.

In addition, the adjustment of the flue gas 18 is performed by the control of the introduction amount of the flue gas.

The adjustment of the introduction amount is performed by the control of an opening degree of a valve $V_2$ or a damper based on pressure loss adjustment for the flue gas introduction line $L_{11}$.

In addition, considering the flue gas introduction line $L_{11}$ as a plurality of series, two or more spray driers 50 may be provided to adjust the supply amount of the flue gas.

In addition, by the temperature measurement, at the time point when it is possible to confirm transitional change from the satisfactory drying state to unsatisfactory drying state by measuring a temperature profile with time, as well as momentary determination, the above-described operation of improving the factor of the unsatisfactory drying may be performed.

According to the embodiment, when the spray-drying of the dehydrated filtrate in which the gypsum is removed from the desulfurization wastewater discharged from the desulfurization device is performed by a part of flue gas, the spray-drying state of the dehydrated filtrate is performed while monitoring the temperature state in the dray area, it is possible to stably keep the spray-drying state, and it is possible to perform the non-drainage of the desulfurization wastewater.

Second Embodiment

Next, an air pollution control system according to a second embodiment will be described.

FIG. 4 is a schematic diagram illustrating a configuration of an air pollution control system according to the second embodiment. In addition, the same reference signs are given to the same configurations as those of the first embodiment described above, and the description thereof is not provided. In an air pollution control system 10B exemplified in FIG. 4, a solid-liquid separation device 41 that removes suspended solids (SS) or suspended substances in the desulfurized filtrate 33 in the air pollution control system 10A according to the first embodiment is provided in the dehydration line $L_{21}$.

As the solid-liquid separation device 41, for example, a liquid cyclone, a belt filter, a classifier, and a membrane separation device may be used.

The solid-liquid separation device 41 removes the suspended solids (SS) of the dehydrated filtrate 33, such that the SS concentration of a separator liquid 42 is equal to or less than 1% by weight and more preferably 0.1 to 0.5% by weight.

Accordingly, the SS concentration is decreased, and it is possible to further suppress a jam of the nozzles or pipes in the spray drier 50.

That is, the SS concentration is equal to or less than 1% by weight and more preferably 0.1 to 0.5% by weight, and the unsatisfactory spray caused by attachment of spray-drying materials at the leading end portions of the spray nozzles at the time of the spray-drying or by attachment growth of the soot dust is suppressed. As a result, driving stop caused by clogging or insufficient drying caused by long necessary drying time based on coarsening of the spray liquid droplet diameters is resolved. In addition, drying unevenness of a drying situation caused by deviation of the spray range, and insufficient drying are resolved.

Figure 4:
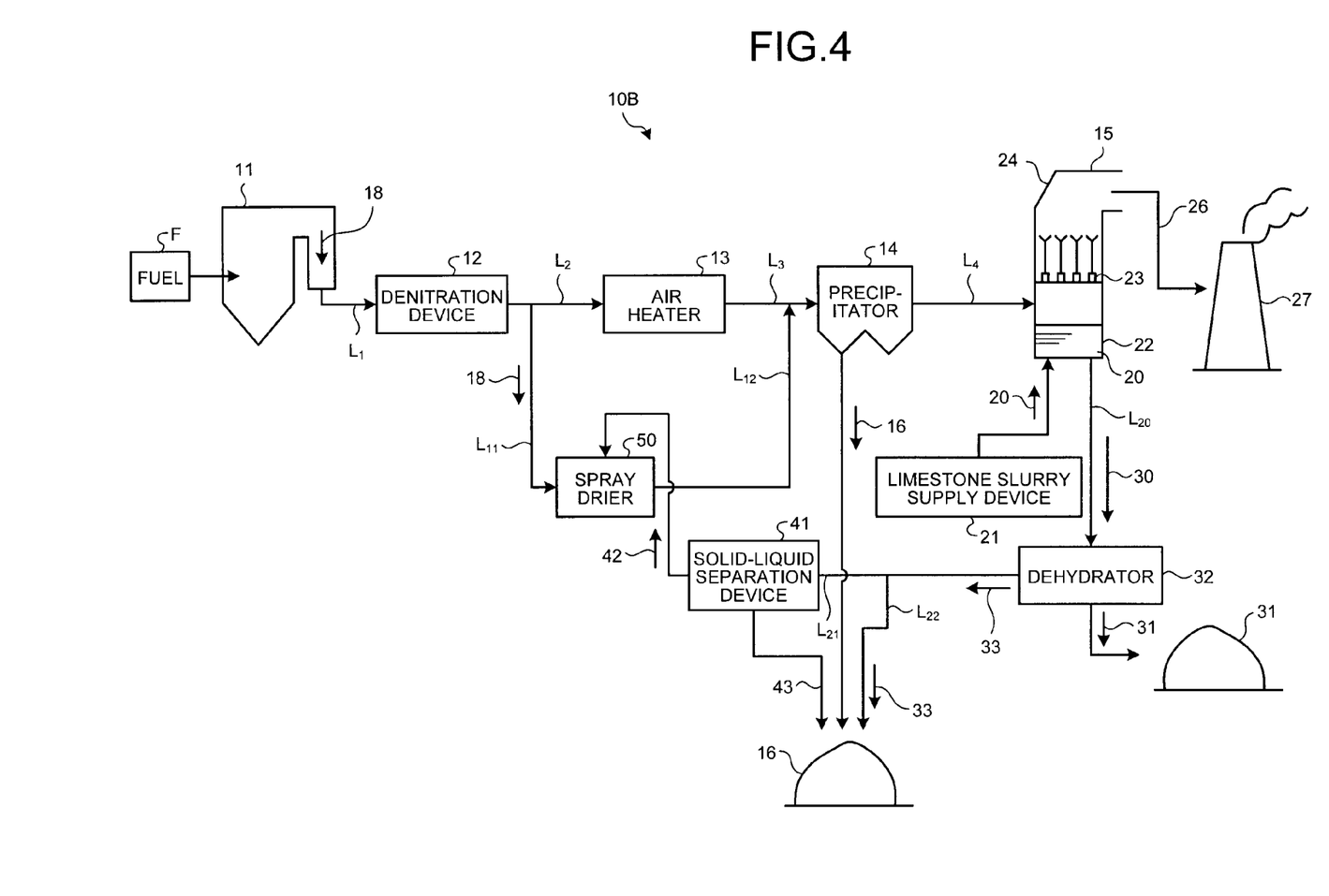
FIG. 4 is a schematic diagram illustrating a configuration of an air pollution control system according to a second embodiment.

A separation residue 43 separated by the solid-liquid separation device may flow together with the precipitation ash 16 to include moisture by the dehydrated filtrate 33.

In addition, when the precipitation ash 16 is separately used alone, the precipitation ash 16 and the residue may be subjected to the spray treatment of the dehydrated filtrate 33 at the separate places.

In addition, a small precipitator may be provided any one or both of the front stage side and read stage side of the spray drier 50 provided on the flue gas introduction line $L_{11}$, to remove the soot dust of the flue gas on the flue gas introduction line $L_{11}$.

In addition, in the introduction of the flue gas 18, the flue gas 18 is introduced into the spray drier 50 or the flue gas 18 is introduced using an attractant fan as necessary, by difference in pressure loss between the flue gas supply line $L_2$ and the flue gas introduction line $L_{11}$.

Third Embodiment

Next, an air pollution control system according to a third embodiment will be described. In addition, the same reference signs are given to the same configurations as those of the first embodiment described above, and the description thereof is not provided.

Figure 5:
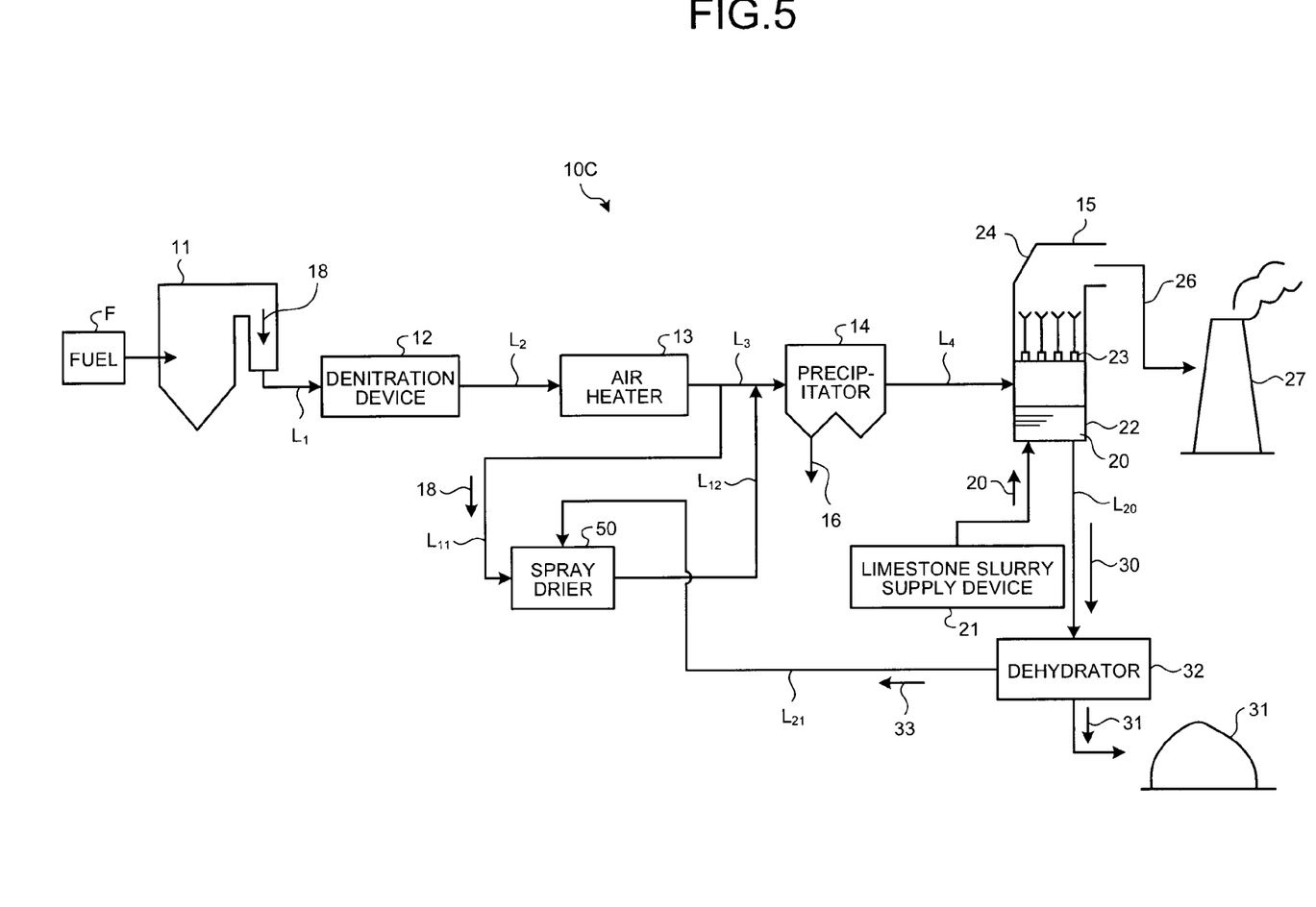
FIG. 5 is a schematic diagram illustrating a configuration of an air pollution control system according to a third embodiment.

FIG. 5 is a schematic diagram illustrating a configuration of an air pollution control system according to the third embodiment. In an air pollution control system 10C according to the embodiment, as illustrated in FIG. 5, the flue gas 18 is branched from the gas supply line $L_3$ of the air heater 13, and the flue gas contributing to the spray-drying in the spray drier 50 is returned again to the gas supply line $L_3$ of the same portion.

Accordingly, it is not necessary to provide the same bypass line as the first embodiment.

REFERENCE SIGNS LIST 10A to 10C AIR POLLUTION CONTROL SYSTEM
11 BOILER
12 DENITRATION DEVICE
13 AIR HEATER
14 PRECIPITATOR
15 DESULFURIZATION DEVICE
16 PRECIPITATION ASH
18 FLUE GAS
20 LIMESTONE SLURRY
21 LIMESTONE SLURRY SUPPLY DEVICE
22 BOTTOM PORTION
23 NOZZLE
24 TOP PORTION
26 PURIFICATION GAS
27 STACK
30 DESULFURIZATION WASTEWATER
32 DEHYDRATOR
33 DEHYDRATED FILTRATE
50 SPRAY DRIER

The invention claimed is:

1. A spray-drying device connected to a first line from which a flue gas is supplied via a first valve, a second line from which a desulfurization water is supplied from a desulfurization device via a second valve and a third line from which the flue gas is discharged comprising:
   a spray-drying device body;
   a spray nozzle that is connected to the second line and provided at a top portion of the spray-drying device body to spray the desulfurization water into the spray-drying device body;
   an inlet that is connected to the first line and provided at an upper portion of the spray-drying device body to introduce the flue gas into the spray-drying device body;
   an outlet that is connected to the third line and provided at a lower portion of the spray-drying device body to discharge the flue gas contributing to the drying;
   a plurality of thermometers that are serially provided in the spray-drying device body below the spray nozzle to obtain a temperature distribution inside of the spray-drying device body;
   a determination unit that determines whether or not a spray-drying state of the dehydrated filtrate is satisfactory on the basis of the temperature distribution as a function of positions of the plurality of thermometers and outputs a result of the determination; and
   a control unit that controls the first valve or the second valve in response to the result of the determination.

2. The spray-drying device according to claim 1, wherein the determination unit is configured to determine,
   (i) that the spray-drying is satisfactory when the temperature distribution has a constant portion, or
   (ii) that the spray-drying is not satisfactory when the temperature distribution continuously decreases toward the outlet.

3. An air pollution control system comprising:
   a boiler that burns fuel;
   an air heater that recovers heat of flue gas from the boiler;
   a precipitator that removes soot dust of the flue gas after the heat recovery;
   a desulfurization device that removes sulfur oxides included in the flue gas after the dust removal by an absorbent;
   a dehydrator that removes gypsum from desulfurization water discharged from the desulfurization device;
   the spray-drying device according to claim 1 provided with a spray unit that sprays the dehydrated filtrate from the dehydrator;
   a flue gas introduction line as the first line to supply a part of the flue gas into the spray-drying device;
   a desulfurization wastewater line as the second line that connect the dehydrator to the spray-drying device to supply the desulfurization water into the spray-drying device; and
   an flue gas supply line as the third line that supplies the flue gas contributing to the drying to a gas supply line.

4. The air pollution control system according to claim 3, further comprising a solid-liquid separation device that removes suspended substances of the dehydrated filtrate sprayed from the dehydrator.

* * * * *

UNITED STATES PATENT AND TRADEMARK OFFICE
CERTIFICATE OF CORRECTION

PATENT NO. : 9,555,341 B2
APPLICATION NO. : 13/988644
DATED : January 31, 2017
INVENTOR(S) : Nobuyuki Ukai et al.

Page 1 of 1

It is certified that error appears in the above-identified patent and that said Letters Patent is hereby corrected as shown below:

On the Title Page

Change:
(73) Assignee: MITSUBISHI POWER SYSTEMS, LTD., Tokyo (JP)

To be:
(73) Assignee: MITSUBISHI HITACHI POWER SYSTEMS, LTD., Kanagawa (JP)

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*